US012586398B2

(12) United States Patent
Brown et al.

(10) Patent No.: US 12,586,398 B2
(45) Date of Patent: Mar. 24, 2026

(54) DETECTING A HOMOGLYPH IN A STRING OF CHARACTERS

(71) Applicant: Google LLC, Mountain View, CA (US)

(72) Inventors: Aaron Michael Brown, Seattle, WA (US); Pranoy Kovuri, Santa Clara, CA (US); Liam Charles MacDermed, Millbrae, CA (US)

(73) Assignee: GOOGLE LLC, Mountain View, CA (US)

( * ) Notice: Subject to any disclaimer, the term of this patent is extended or adjusted under 35 U.S.C. 154(b) by 295 days.

(21) Appl. No.: 18/300,016

(22) Filed: Apr. 13, 2023

(65) Prior Publication Data

US 2024/0346840 A1     Oct. 17, 2024

(51) Int. Cl.
*G06V 30/19*          (2022.01)
*G06F 40/284*        (2020.01)

(52) U.S. Cl.
CPC .. *G06V 30/19093* (2022.01); *G06V 30/19013* (2022.01); *G06F 40/284* (2020.01)

(58) Field of Classification Search
CPC ........ G06V 30/19093; G06V 30/19013; G06F 40/284; G06F 21/554; G06F 21/561; H04L 63/1483
See application file for complete search history.

(56) References Cited

U.S. PATENT DOCUMENTS 10,824,922 B1 * 11/2020 Tutar ............... G06V 30/19173
10,943,067 B1   3/2021 Brown et al.

11,212,313 B2   12/2021 Schulman et al.
11,843,633 B2   12/2023 Chiba et al.
2014/0115704 A1 * 4/2014 Miller ................. H04L 63/1416
                                                                726/23
2018/0007070 A1 * 1/2018 Kulkarni ............. H04L 63/1425

OTHER PUBLICATIONS

Plagiarism Detection (Year: 2017).*
ShamFinder (Year: 2017).*
Faisal et al., "Plagiarism detection in texts obfuscated with homoglyphs." In Advances in Information Retrieval: 39th European Conference on IR Research, ECIR 2017, Aberdeen, UK, Apr. 8-13, 2017, Proceedings 39, pp. 669-675, Springer International Publishing, 2017.
International Search Report and Written Opinion for Application No. PCT/US2023/031969, mailed Jan. 2, 2024, 13 pages.
Suzuki et al., "ShamFinder: An automated framework for detecting IDN homographs.", In Proceedings of the Internet Measurement Conference, pp. 449-462. 2019.
International Preliminary Report on Patentability for Application No. PCT/US2023/031969, mailed Oct. 23, 2025, 7 pages.

\* cited by examiner

*Primary Examiner* — Huo Long Chen
(74) *Attorney, Agent, or Firm* — DORITY & MANNING P.A.

(57)          ABSTRACT

A method for detecting a homoglyph in an input text includes receiving a first string of characters and deobfuscating the first string of characters to generate a second string of characters. When at least one character from the first string of characters has replaced another character in the second string of characters based on the deobfuscating, the method further includes determining a visual similarity value based on the first string of characters and the second string of characters and providing an indication whether a homoglyph is present in the first string of characters, based on the visual similarity value.

20 Claims, 9 Drawing Sheets

1000

Figures 3A, 3B:
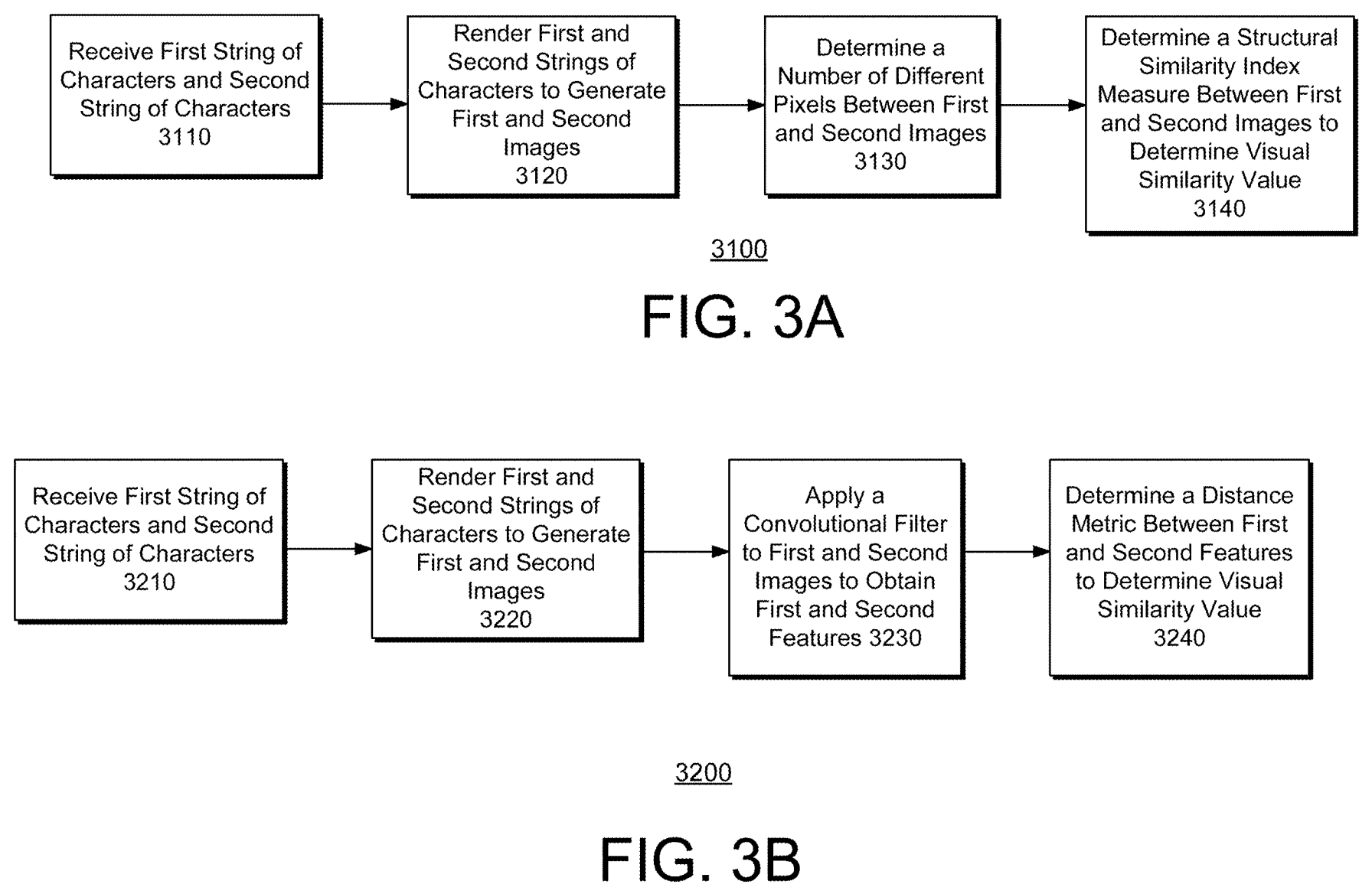

Receive First String of Characters and Second String of Characters
3110

Render First and Second Strings of Characters to Generate First and Second Images
3120

Determine a Number of Different Pixels Between First and Second Images
3130

Determine a Structural Similarity Index Measure Between First and Second Images to Determine Visual Similarity Value
3140

Receive First String of Characters and Second String of Characters
3210

Render First and Second Strings of Characters to Generate First and Second Images
3220

Apply a Convolutional Filter to First and Second Images to Obtain First and Second Features 3230

Determine a Distance Metric Between First and Second Features to Determine Visual Similarity Value
3240

| | Obfuscated Text | Deobfuscated Text | Number of Characters Replaced | Pixel-wise Render Distance (%) | Mean Structural Similarity | Human-readable SSIM Score |
|---|---|---|---|---|---|---|
| 1 | yeti-🐾 | yeti-🐾 | 0 | 0 (0.0%) | 1 | 0 |
| 2 | Ꭺddlɔ | yddilc | 4 | 1690 (0.52%) | 0.991262885 | 0.87 |
| 3 | perfectly normal | perfectly normal | 0 | 0 (0.0%) | 1 | 0 |
| 4 | πbots | nbots | 1 | 1052 (0.32%) | 0.995509583 | 0.45 |
| 5 | asksmeet | asksmeet | 1 | 23 (0.01%) | 0.999736530 | 0.03 |
| 6 | meet | meet | 3 | 1225 / (0.37%) | 0.993199566 | 0.68 |
| 7 | Ꝺot Ꞧeally a Ᏻreat Ᏺomoglyph | Not Really a Great Homoglyph | 24 | 8854 (2.7%) | 0.952965358 | 4.7 |
| | | | | | | |

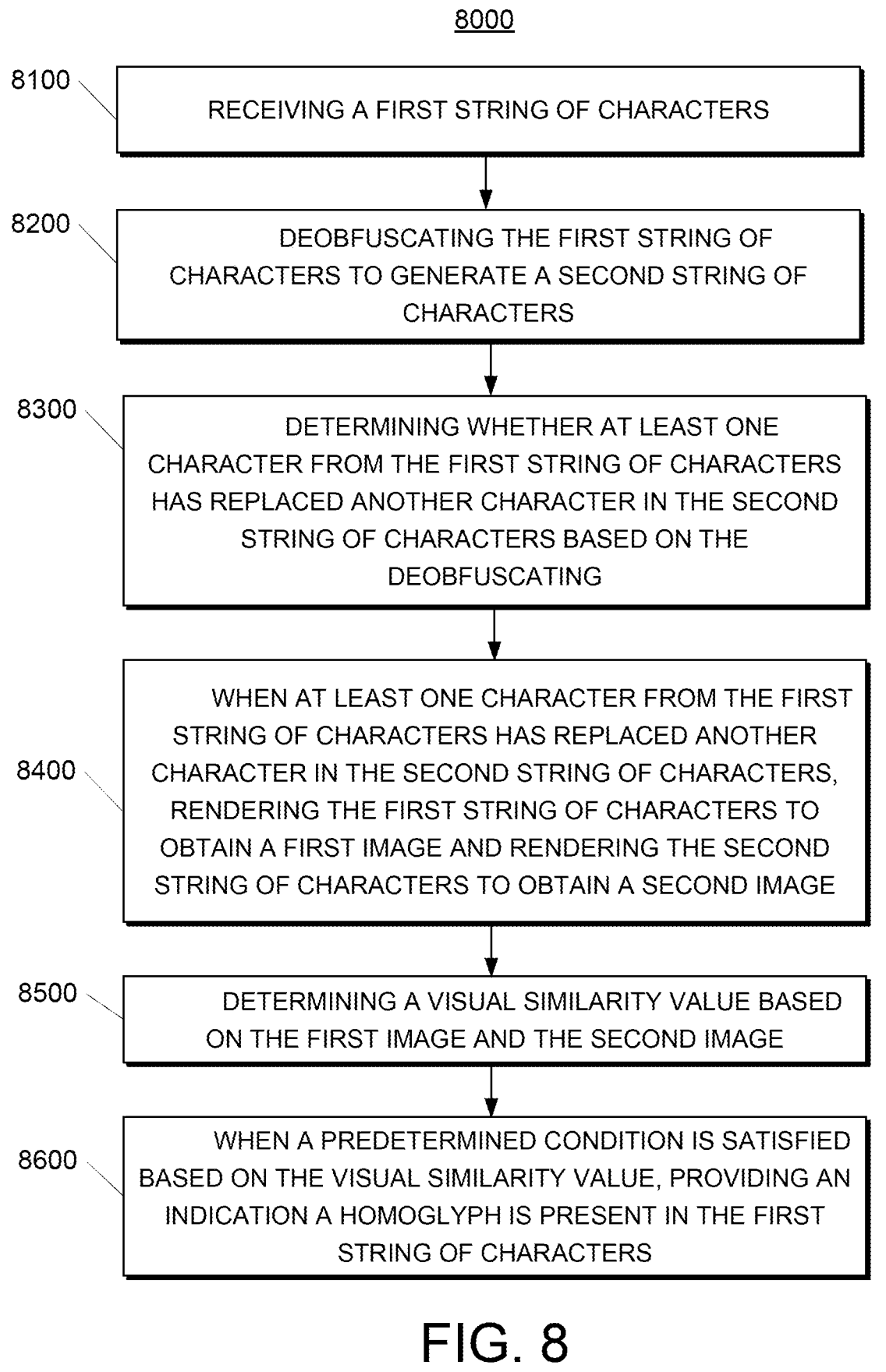

8100 — RECEIVING A FIRST STRING OF CHARACTERS

8200 — DEOBFUSCATING THE FIRST STRING OF CHARACTERS TO GENERATE A SECOND STRING OF CHARACTERS

8300 — DETERMINING WHETHER AT LEAST ONE CHARACTER FROM THE FIRST STRING OF CHARACTERS HAS REPLACED ANOTHER CHARACTER IN THE SECOND STRING OF CHARACTERS BASED ON THE DEOBFUSCATING

8400 — WHEN AT LEAST ONE CHARACTER FROM THE FIRST STRING OF CHARACTERS HAS REPLACED ANOTHER CHARACTER IN THE SECOND STRING OF CHARACTERS, RENDERING THE FIRST STRING OF CHARACTERS TO OBTAIN A FIRST IMAGE AND RENDERING THE SECOND STRING OF CHARACTERS TO OBTAIN A SECOND IMAGE

8500 — DETERMINING A VISUAL SIMILARITY VALUE BASED ON THE FIRST IMAGE AND THE SECOND IMAGE

8600 — WHEN A PREDETERMINED CONDITION IS SATISFIED BASED ON THE VISUAL SIMILARITY VALUE, PROVIDING AN INDICATION A HOMOGLYPH IS PRESENT IN THE FIRST STRING OF CHARACTERS

FIG. 8

DETECTING A HOMOGLYPH IN A STRING OF CHARACTERS

FIELD

The disclosure relates generally to methods and computing systems for detecting the presence of a homoglyph in an input text string. For example, the disclosure relates to methods and computing systems for determining whether a string of characters (e.g., included as part of a textual input or entry) received by a computing system includes a homoglyph.

BACKGROUND

Homoglyphs are characters or symbols that are visually similar or identical to another character or symbol but are treated as distinct characters by computing systems. For example, a homoglyph may have a different Unicode code point than another character which is visually similar. For example, the digit "0" and the capital letter "O" are homoglyphs because they look very similar but have different Unicode code points. In some circumstances, homoglyphs can be used for malicious purposes, such as for phishing attacks, bypassing spam filters, creating links to illegitimate websites, and the like.

SUMMARY

Aspects and advantages of embodiments of the disclosure will be set forth in part in the following description, or can be learned from the description, or can be learned through practice of the example embodiments.

In one or more example embodiments, a computer implemented method for detecting the presence of a homoglyph is provided. For example, the method includes receiving a first string of characters and deobfuscating the first string of characters to generate a second string of characters. When at least one character from the first string of characters has replaced another character in the second string of characters based on the deobfuscating, the method further includes determining a visual similarity value based on the first string of characters and the second string of characters and providing an indication whether a homoglyph is present in the first string of characters, based on the visual similarity value.

In some implementations, determining the visual similarity value comprises: rendering the first string of characters to obtain a first image, rendering the second string of characters to obtain a second image; and determining a number of pixels which are different between the first image and the second image to obtain a first visual similarity value.

In some implementations, determining the visual similarity value further comprises: measuring a structural similarity between the first image and the second image to obtain a second visual similarity value.

In some implementations, the visual similarity value is based on a weighted sum of the first visual similarity value and the second visual similarity value.

In some implementations, the first image and the second image are rendered in a same font.

In some implementations, the method further includes determining the homoglyph is present in the first string of characters when the visual similarity value is greater than a first threshold value and less than a second threshold value.

In some implementations, providing the indication whether the homoglyph is present in the first string of characters is further based on a number of characters from the first string of characters which have replaced another character in the second string of characters based on the deobfuscating.

In some implementations, the first string of characters is provided in an electronic communication, and when the indication indicates the homoglyph is present in the first string of characters, the method further comprises at least one of: providing a notification indicating the first string of characters includes the homoglyph, classifying the electronic communication as spam or unsolicited, or removing the first string of characters from the electronic communication.

In some implementations, the first string of characters is an input to a messaging platform, and when the indication indicates the homoglyph is present in the first string of characters, the method further comprises preventing the first string of characters from being presented on the messaging platform or removing the first string of characters from the messaging platform.

In some implementations, deobfuscating the first string of characters to generate the second string of characters comprises applying a mapping to each character from among the first string of characters to generate the second string of characters, and the method further comprises determining whether at least one character from among the first string of characters has replaced another character from among the second string of characters based on whether the mapping indicates at least one character from among the first string of characters is a substitute for another character from among the second string of characters.

In some implementations, determining the visual similarity value further comprises: applying a convolutional filter to the first image and the second image to obtain a first feature map corresponding to the first image and a second feature map corresponding to the second image; and measuring a structural similarity between the first feature map and the second feature map to obtain a second visual similarity value.

In some implementations, the first image and the second image are rendered in a same font, the visual similarity value is based on a weighted sum of the first visual similarity value and the second visual similarity value, and the method further comprises determining the homoglyph is present in the first string of characters when the visual similarity value is greater than a first threshold value and less than a second threshold value.

In some implementations, determining the visual similarity value further comprises: applying an optical character recognition (OCR) process to the first image to obtain a first OCR string of characters and to the second image to obtain a second OCR string of characters; and calculating a Hamming distance between the first OCR string of characters and the second OCR string of characters to obtain a second visual similarity value.

In some implementations, the first image and the second image are rendered in a same font, the visual similarity value is based on a weighted sum of the first visual similarity value and the second visual similarity value, and the method further comprises determining the homoglyph is present in the first string of characters when the visual similarity value is greater than a first threshold value and less than a second threshold value.

In one or more example embodiments, a computing device (e.g., a server computing system, a laptop, table, smartphone, etc.) is provided. The computing device may include one or more processors; and one or more non-transitory computer-readable media that store instructions that, when executed by the one or more processors, cause the computing system to perform operations. For example, the operations may include receiving a first string of characters, deobfuscating the first string of characters to generate a second string of characters, when at least one character from the first string of characters has replaced another character in the second string of characters based on the deobfuscating, determining a visual similarity value based on the first string of characters and the second string of characters, and providing an indication whether a homoglyph is present in the first string of characters, based on the visual similarity value.

In some implementations, determining the visual similarity value comprises: rendering, in a first font, the first string of characters to obtain a first image, rendering, in the first font, the second string of characters to obtain a second image: determining a number of pixels which are different between the first image and the second image to obtain a first visual similarity value: measuring a structural similarity between the first image and the second image to obtain a second visual similarity value; and determining the visual similarity value based on a weighted sum of the first visual similarity value and the second visual similarity value.

In some implementations, as the number of pixels different between the first image and the second image decreases, the first visual similarity value increases.

In some implementations, providing the indication whether the homoglyph is present in the first string of characters is further based on a number of characters from the first string of characters which have replaced another character in the second string of characters based on the deobfuscating.

In some implementations, the first string of characters is provided in an electronic communication, and when the indication indicates the homoglyph is present in the first string of characters, the operations further comprise at least one of: providing a notification indicating the first string of characters includes the homoglyph, classifying the electronic communication as spam or unsolicited, or removing the first string of characters from the electronic communication.

In one or more example embodiments, a computer implemented method for detecting the presence of a homoglyph is provided. For example, the method includes receiving a first string of characters, deobfuscating the first string of characters to generate a second string of characters, determining whether at least one character from the first string of characters has replaced another character in the second string of characters based on the deobfuscating, when at least one character from the first string of characters has replaced another character in the second string of characters, rendering the first string of characters to obtain a first image and rendering the second string of characters to obtain a second image, determining a visual similarity value between the first image and the second image, and when a predetermined condition is satisfied based on the visual similarity value, providing an indication a homoglyph is present in the first string of characters.

In one or more example embodiments, a computer-readable medium (e.g., a non-transitory computer-readable medium) which stores instructions that are executable by one or more processors of a computing system is provided. In some implementations the computer-readable medium stores instructions which may include instructions to cause the one or more processors to perform one or more operations which are associated with any of the methods described herein (e.g., operations of the server computing system and/or operations of the computing device). For example, the operations may include operations to receive a first string of characters, deobfuscate the first string of characters to generate a second string of characters, and determine whether at least one character from the first string of characters has replaced another character in the second string of characters based on the deobfuscation. The operations may further include operations to, when at least one character from the first string of characters has replaced another character in the second string of characters, determine a visual similarity value between the first string of characters and the second string of characters, and provide an indication whether a homoglyph is present in the first string of characters, based on the visual similarity value. The computer-readable medium may store additional instructions to execute other aspects of the server computing system and computing device and corresponding methods of operation, as described herein.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which:

FIGS. 3A-3C illustrate example flow diagrams for determining visual similarity values, according to one or more example embodiments of the disclosure:

FIG. 5 is an example table illustrating results for deobfuscating various input strings of characters and determining visual similarity values, according to one or more example embodiments of the disclosure:

FIG. 8 illustrates another example flow diagram of a non-limiting computer-implemented method according to one or more example embodiments of the disclosure.

DETAILED DESCRIPTION

Examples of the disclosure are directed to computing systems and computer-implemented methods for identifying or detecting the presence of a homoglyph in a string of characters.

Homoglyphs are characters or symbols that are visually similar or identical to another character or symbol but are treated as distinct characters by computing systems. For example, a homoglyph may have a different Unicode code point than another character which is visually similar. For example, the letter "I" and the capital letter "I" are homoglyphs because they look very similar but have different Unicode code points. Similarly, the Cyrillic letter "a" looks identical to the Latin letter "a" but has a different Unicode code point. In some circumstances, homoglyphs can be used for malicious purposes, such as for phishing attacks, bypassing spam filters, creating links to illegitimate websites, and the like.

As a technical solution to the challenges raised by homoglyphs, the present disclosure provides methods and computing systems for determining whether a string of characters (e.g., included as part of a textual input or entry) received by a computing system includes a homoglyph. In response to determining that the string of characters includes a homoglyph, appropriate actions can be taken. For example, when the string of characters is included in an electronic communication and the computing system determines a homoglyph is present in the string of characters and the presence of the homoglyph indicates a malicious intent, the string of characters can be removed from the electronic communication.

The disclosure provides numerous technical effects and benefits. The disclosure provides an improved method for determining the presence of a homoglyph in a character string. The disclosure provides an improved method for preventing homoglyph attacks, thereby improving the security of computing systems. The disclosed methods can prevent or mitigate online fraud, prevent and remove unwanted or harmful character strings which are provided in electronic communications. Thus, according to aspects of the disclosure, technical benefits such as increased accuracy in detecting homoglyphs and improved security in computing systems may be achieved.

Figure 1:
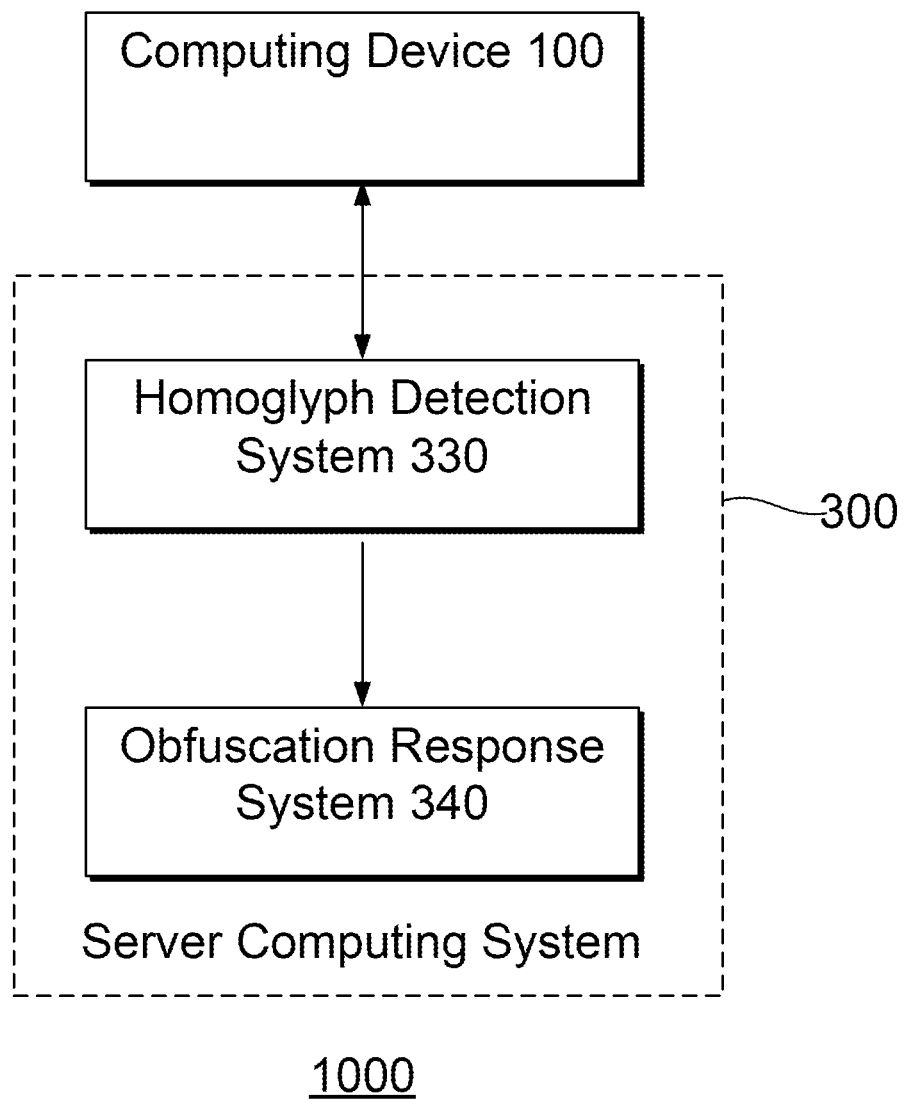
FIG. 1 illustrates an example system, according to one or more example embodiments of the disclosure.

Referring now to the drawings, FIG. 1 illustrates an example system for detecting homoglyphs, according to one or more example embodiments of the disclosure. For example, FIG. 1 includes a computing device 100 and a server computing system 300 which includes a homoglyph detection system 330 and an obfuscation response system 340.

The computing device 100 can be any type of computing device, such as, for example, a personal computing device (e.g., laptop or desktop), a mobile computing device (e.g., smartphone or tablet), a gaming console or controller, a wearable computing device (e.g., a virtual/augmented reality device, etc.), an embedded computing device, a broadcasting computing device (e.g., a webcam, etc.), or any other type of computing device.

The server computing system 300 may receive a text input from the computing device 100 which includes a first string of characters. The homoglyph detection system 330 may be configured to determine whether the first string of characters (e.g., included as part of the text input) includes a homoglyph.

To provide an example, the server computing system 300 may receive a text input by a user of the computing device 100 which includes a first string of characters "Addip". The server computing system 300 can deobfuscate the first string of characters "Addio" to generate a second string of characters "yddilc," for example by referencing a database which maps obfuscated characters to deobfuscated characters. In this example, based on a comparison between the first string of characters and the second string of characters the server computing system 300 determines three characters from the second string of characters were replaced via obfuscation.

The server computing system 300 can further determine a visual similarity value between the first string of characters and the second string of characters. For example, the visual similarity value can be determined by the server computing system 300 based on a structural similarity between rendered first and second images corresponding to the first string of characters and the second string of characters. The visual similarity value can be based on a number of pixels which are different between the rendered first and second images. The visual similarity value can also be based on a structural similarity index measure (SSIM) or other metric which quantitatively describes the differences between images (average error, mean absolute error, mean squared error, peak signal-to-noise ratios, feature-based metrics, and the like). For example, the SSIM metric takes into account the structural information of the image and may be based on the luminance, contrast, and structure of the image. For example, the SSIM value may range from 0 to 1, with 1 indicating the rendered first and second images are identical.

Based on the visual similarity value, the server computing system 300 can determine whether a homoglyph is present in the first string of characters and take appropriate action as needed when it is determined the homoglyph is present. For example, the server computing system 300 can provide a notification indicating the first string of characters includes the homoglyph. If the first string of characters is included in an electronic communication (e.g., a text message, an e-mail, etc.), the server computing system 300 can classify the electronic communication as spam or unsolicited, or remove the first string of characters from the electronic communication. As another example, if the first string of characters is part of an input text to a messaging platform, the server computing system 300 can prevent the first string of characters from being presented on the messaging platform or remove the first string of characters from the messaging platform.

An example process for detecting the presence of a homoglyph in a string of characters according to examples of the disclosure is as follows.

As a first operation, the server computing system 300 receives a first string of characters. For example, the first string of characters may be transmitted to the server computing system 300 from the computing device 100 as part of a text input by a user at the computing device 100 (e.g., a comment on a live feed of a messaging platform). As another example, the first string of characters may be transmitted to the server computing system 300 from the computing device 100 as part of a text that corresponds to a web address (e.g., a uniform resource locator) in an electronic communication (e.g., an email).

As a next operation, the server computing system 300 may perform a deobfuscation process with respect to the first string of characters to generate a second string of characters. For example, the first string of characters may have been obfuscated according to various obfuscation methods including base64 encoding, character substitution, hexadecimal encoding, and the like. Based on the type of obfuscation used, the first string of characters can be deobfuscated to generate the second string of characters. For example, when the base64 encoding obfuscation method has been utilized, the server computing system 300 may implement a base64 decoder to convert the first string of characters back into its original format (i.e., a second string of characters). For example, when the hexadecimal encoding obfuscation method has been utilized, the server computing system 300 may implement a hexadecimal decoder to convert the first string of characters back into its original format (i.e., a second string of characters). For example, when the character substitution method has been utilized, the server computing system 300 may implement a mapping of the substitutions by identifying which characters in the first string of characters have been replaced, and what they have been replaced with. For example, the server computing system 300 may identify that the letter "l" was replaced with the capital letter "I". The server computing system 300 may reference known mappings of characters (e.g., confusable mappings) which can be stored in a database to determine which characters have been replaced. As an example, a string of characters such as "yddilc" may be obfuscated by the string of characters ꓯddיɔ.

After obtaining the second string of characters, if at least one character among the second string characters was obfuscated (i.e., replaced), a visual similarity value may be determined by the server computing system 300 based on the first and second string of characters. The visual similarity value may be determined by the server computing system 300 rendering the input first string of characters (e.g., by using a text rendering library) to obtain a first image and rendering the second string of characters (e.g., by using the text rendering library) to obtain a second image. For example, each of the first string of characters and second string of characters can be rendered using a same font (e.g., Roboto, Arial, etc.). In some implementations, the server computing system 300 can obtain a visual similarity metric or value by calculating the Structural Similarity Index Measure (SSIM) of the first and second images. This gives a measure of perceived difference between the first and second images. SSIM is advantageous in that an SSIM can be obtained for non-textual characters (such as an emoji) and the process for determining the SSIM is much faster and simpler than an optical character recognition based approach.

The visual similarity value can be used by the server computing system 300 as a score of the level of visual deobfuscation in the first string of characters. This can be used along with the number of deobfuscated characters in the first string of characters (the distance between the two strings) to assess what kind of obfuscation occurred and the measure can be used to make automated filtering or moderation decisions. For example, the server computing system 300 may determine (detect) a homoglyph is present in the first string of characters (e.g., the presence of a homoglyph attack). In some implementations, the server computing system 300 may determine that a homoglyph is malicious based on the visual similarity value. In addition, a deobfuscation library may be updated by finding new visually-similar characters to add to mappings.

For example, a higher visual similarity value between the first string of characters and the second string of characters (i.e., the obfuscated and deobfuscated strings) in which at least one character was mapped will be considered more likely to be a homoglyph than a lower visual similarity value. For example, when a visual similarity value is greater than a threshold value, the first string of characters can be considered a homoglyph attack.

As mentioned above, in some implementations, the server computing system 300 can determine a visual similarity value by determining a structural similarity between first and second images which correspond to the first and second character strings. For example, the server computing system 300 may determine pixel-wise differences using image comparison tools, an image-diffing library, and the like. For example, where the number of pixels which are different between the first and second images is low, the structural similarity is determined to be more similar compared to where the number of pixels which are different between the first and second images is high. As the structural similarity increases, the more likely a homoglyph attack is present. If kerning or other width changes are present, the server computing system 300 may be configured to utilize a fixed-width font with respect to the first and second string of characters. For example, when the SSIM (visual similarity value) is above a threshold value, the server computing system 300 may determine the obfuscation is meant to be a homoglyph attack.

In some implementations, the server computing system 300 can determine a visual similarity value by determining a convolutional similarity between first and second images which correspond to the first and second character strings. For example, the server computing system 300 may apply a convolutional filter to assess a similarity between the first and second images, with more similar images considered more indicative of homoglyphic attacks. For example, the server computing system 300 may extract features from each of the first image and the second image, obtain a feature map for each of the first image and the second image based on the extracted features, and determine a similarity value indicating a degree of similarity between the feature maps using a distance metric (e.g., by using a cosine similarity or Euclidean distance). The similarity between the first and second images may be normalized to obtain a value between 0 and 1 with 1 indicating the images are identical and 0 indicating the images are completely dissimilar. For example, when the similarity score (visual similarity value) is above a threshold value, the server computing system 300 may determine the obfuscation is meant to be a homoglyph attack.

In some implementations, the server computing system 300 can determine a visual similarity value by determining an optical character recognition (OCR) distance between first and second images which correspond to the first and second character strings. For example, the server computing system 300 may perform optical character recognition on the first and second images and then calculate a Hamming distance of the two resulting OCR'd strings, with a lower Hamming distance indicating a likely homoglyph attack. For example, corresponding pixels in the two images can be compared where, for each pixel position, if the values in the two images are the same, the Hamming distance is incremented by 0 and if the values are different, the Hamming distance is incremented by 1. For example, the total Hamming distance can be divided by the total number of pixels in the first and second images to determine the similarity between the images. If there are no differences (i.e., the first and second images are identical) the Hamming distance is zero. In some implementations, a scale between 0 and 1 can be utilized by normalizing the Hamming distance, where 1 indicates the images are identical and 0 indicates the images are completely dissimilar.

For example, when the similarity score (visual similarity value) is above a threshold value, the server computing system 300 may determine the obfuscation is meant to be a homoglyph attack. In response to determining the string of characters includes the homoglyph, appropriate actions can be taken by the obfuscation response system 340. For example, the obfuscation response system 340 can be configured to, in response to a homoglyph being detected in the first string of characters, perform one or more operations including one or more of providing a notification indicating the first string of characters includes the homoglyph, classifying the electronic communication (e.g., as spam or unsolicited), removing the first string of characters from the electronic communication or content associated with the first string of characters, preventing the first string of characters from being presented on or transmitted to another computing device, updating a database which maps homoglyphs to characters, or tracking or monitoring a source of the homoglyph.

As will be explained below, FIG. 2 describes further details regarding operations of the server computing system 300 (including the homoglyph detection system 330) for detecting a homoglyph in a string of characters based on a visual similarity value. FIGS. 3A-3B describe various operations for determining the visual similarity value while FIG. 4 describes various operations which may be performed by the obfuscation response system 340 in response to determining the visual similarity value.

Figure 2:
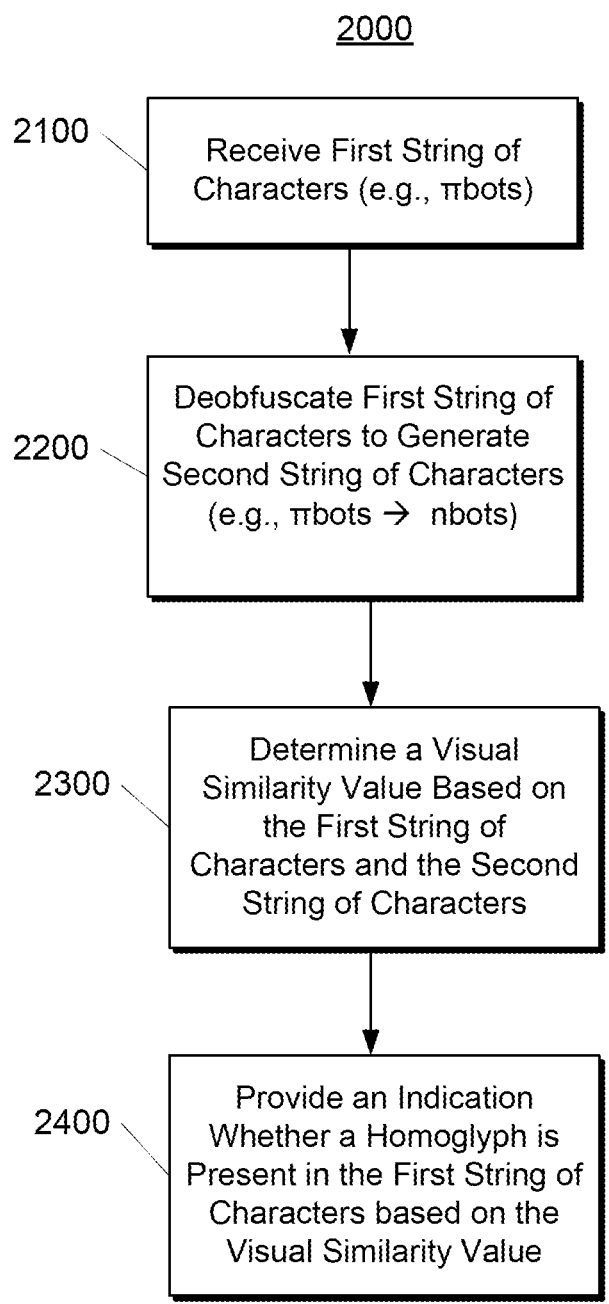
FIG. 2 illustrates an example flow diagram of a non-limiting computer-implemented method according to one or more example embodiments of the disclosure.

Referring again to the drawings, FIG. 2 illustrates an example flow diagram of a non-limiting computer-implemented method according to one or more example embodiments of the disclosure. In FIG. 2, the method 2000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, operations of the method 2000 are performed by the homoglyph detection system 330 and/or obfuscation response system 340 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 2, method 2000 includes an operation 2100 of the server computing system 300 receiving a first string of characters from the computing device 100. In the example of FIG. 2, the first string of characters may be "πbots". For example, the computing device 100 may receive or obtain a first string of characters from a user of the computing device 100. For example, the input string of characters may be input to the computing device 100 via various methods (e.g., via a keyboard, via a touch screen on a display device, via a voice input, etc.). For example, the first string of characters may be included as part of the content in an electronic communication. For example, the first string of characters may be included as part of the content of a chat message in a social network application, as part of a text message in a communication between computing devices (e.g., smartphones), as part of a uniform resource locator (URL) included as part of a link to a website in an e-mail, etc. The electronic communication including the first string of characters may be transmitted to the server computing system 300 over a network. For example, an intended destination of the electronic communication may be the server computing system 300 itself, or an external computing device (e.g., external computing device 200 in FIG. 5) where the server computing system 300 may be an intermediary destination or node which serves to monitor or filter electronic communications (e.g., for computer security purposes) before forwarding or transmitting the electronic communication to the external computing device.

At operation 2200, in response to the server computing system 300 receiving the first string of characters, the server computing system 300 may be configured to deobfuscate the first string of characters to generate a second string of characters, for example, by referencing the deobfuscation mapping data store 360 (see FIG. 6) which maps obfuscated characters to deobfuscated characters. For example, the homoglyph detection system 330 can deobfuscate the first string of characters "πbots" to generate a second string of characters "nbots," for example by referencing the deobfuscation mapping data store 360. For example, the deobfuscation mapping data store 360 can store a list of confusable characters (characters that may be confused with others). For example, the first string of characters may have been obfuscated according to various obfuscation methods including base64 encoding, character substitution, hexadecimal encoding, and the like. Based on the type of obfuscation used, the first string of characters can be deobfuscated by the homoglyph detection system 330 to generate the second string of characters. For example, when the base64 encoding obfuscation method has been utilized, the homoglyph detection system 330 may implement a base64 decoder to convert the first string of characters back into its original format (i.e., a second string of characters). For example, when the hexadecimal encoding obfuscation method has been utilized, the homoglyph detection system 330) may implement a hexadecimal decoder to convert the first string of characters back into its original format (i.e., a second string of characters). For example, when the character substitution method has been utilized, the homoglyph detection system 330 may implement a mapping of the substitutions by identifying which characters in the first string of characters have been replaced, and what they have been replaced with. For example, the homoglyph detection system 330 may identify that the lowercase letter "l" was replaced with the capital letter "I". The homoglyph detection system 330 may reference known mappings of characters (e.g., confusable mappings) which can be stored at deobfuscation mapping data store 360 or at other sources (e.g., external content 500) to determine which characters have been replaced.

The homoglyph detection system 330 may further be configured to determine the number of characters which have been obfuscated. For example, the homoglyph detection system 330) can determine whether at least one character from among the first string of characters has replaced another character from among the second string of characters based on whether the mapping of obfuscated characters to deobfuscated characters indicates at least one character from among the first string of characters is a substitute for another character from among the second string of characters. In the example where the first string of characters "πbots" obfuscates the second string of characters "nbots," the homoglyph detection system 330 would determine one character from the second string of characters was replaced via obfuscation, based on a comparison between the first string of characters and the second string of characters.

After obtaining the second string of characters, if at least one character among the second string characters was obfuscated (i.e., replaced), at operation 2300 the server computing system 300 may be configured to determine a visual similarity value based on the first and second string of characters. The visual similarity value may be determined by the homoglyph detection system 330 performing a process including rendering the first string of characters (e.g., by using a text rendering library) to obtain a first image and by rendering the second string of characters (e.g., by using the text rendering library) to obtain a second image. For example, each of the first string of characters and second string of characters can be rendered using a same font (e.g., Roboto, Arial, etc.).

In some implementations, the homoglyph detection system 330 can obtain a visual similarity metric or value by calculating the Structural Similarity Index Measure (SSIM) of the first and second images, by determining a convolutional similarity between first and second images, or by determining an optical character recognition (OCR) distance between the first and second images. In some implementations, the homoglyph detection system 330 can obtain a visual similarity metric or value based on a combination of the visual similarity metrics or values obtained via the above-mentioned methods.

For example, the visual similarity value can be used by the homoglyph detection system 330 as a score of the level of visual deobfuscation in the first string of characters. This can be used along with the number of deobfuscated characters in the first string of characters (the distance between the two strings) to assess what kind of obfuscation occurred and the measure can be used by the server computing system 300 to make automated filtering or moderation decisions. For example, the homoglyph detection system 330 may determine (detect) a homoglyph is present in the first string of characters (e.g., the presence of a homoglyph attack). In some implementations, the homoglyph detection system 330) and/or obfuscation response system 340 may determine that a homoglyph is malicious based on the visual similarity value.

For example, a higher visual similarity value between the first string of characters and the second string of characters (i.e., the obfuscated and deobfuscated strings) in which at least one character was mapped will be considered more likely to be a homoglyph than another string of characters having a lower visual similarity value. For example, when a visual similarity value is greater than a threshold value, the homoglyph detection system 330 and/or obfuscation response system 340 may determine the first string of characters is part of a homoglyph attack.

At operation 2400 the server computing system 300 can provide an indication whether a homoglyph is present in the first string of characters based on the visual similarity value obtained at operation 2300. For example, the homoglyph detection system 330 can determine whether a homoglyph is present in the first string of characters and the obfuscation response system 340) can take appropriate action as needed when it is determined the homoglyph is present. For example, the obfuscation response system 340 can provide a notification indicating the first string of characters includes the homoglyph. The notification may be in the form of an alert which is output to a user (e.g., an administrator), or may be in the form of a signal or output which causes the server computing system 300 or another computing device to perform some other action in response to receiving the signal or output. For example, if the first string of characters includes a homoglyph and is included in an electronic communication (e.g., a text message, an e-mail, etc.), the obfuscation response system 340) can classify the electronic communication as spam or unsolicited or remove the first string of characters from the electronic communication. As another example, if the first string of characters includes the homoglyph and is part of an input text to a messaging platform, the obfuscation response system 340 can prevent the first string of characters from being presented on the messaging platform or remove the first string of characters from the messaging platform.

Figure 3C:
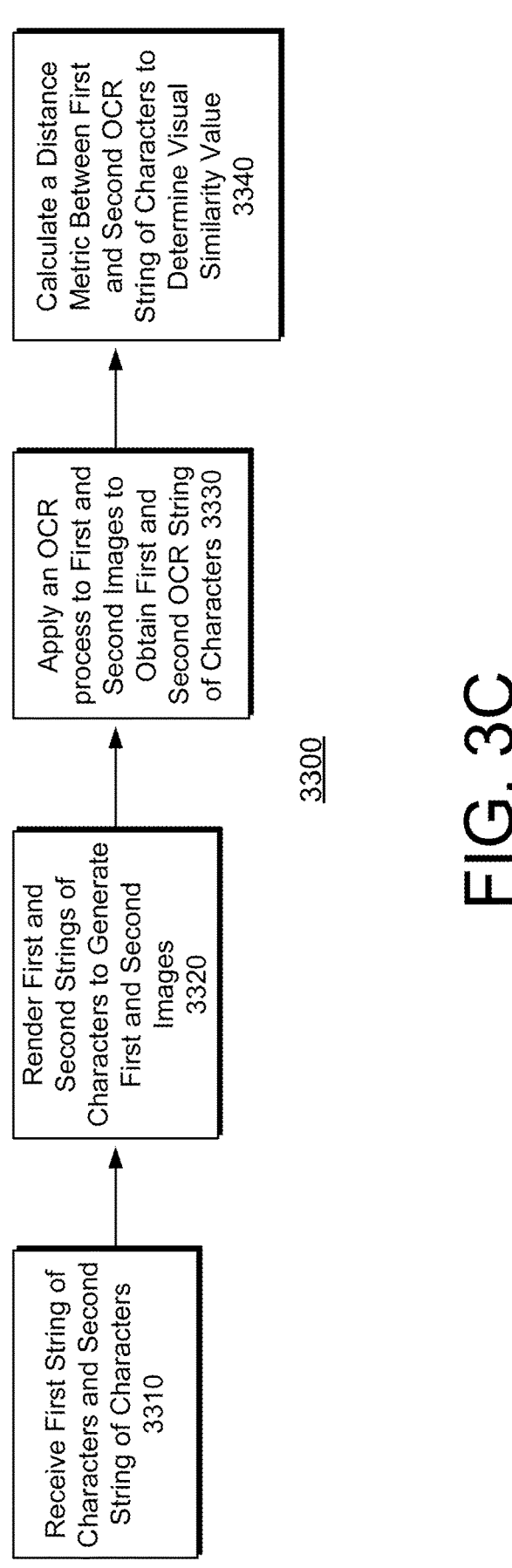

FIGS. 3A-3C illustrate example flow diagrams for determining visual similarity values, according to one or more example embodiments of the disclosure. As explained above, the homoglyph detection system 330 can obtain a visual similarity metric or value by calculating the Structural Similarity Index Measure (SSIM) of the first and second images, by determining a convolutional similarity between first and second images, or by determining an optical character recognition (OCR) distance between the first and second images. In some implementations, the homoglyph detection system 330 can obtain a visual similarity metric or value based on a combination (e.g., a weighted combination) of the visual similarity metrics or values obtained via the above-mentioned methods.

Methods 3100, 3200, 3300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, operations of the methods 3100, 3200, 3300 are performed by the homoglyph detection system 330 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3A illustrates a method 3100 for obtaining a visual similarity metric or value by calculating the Structural Similarity Index Measure (SSIM) of the first and second images, FIG. 3B illustrates a method 3200 for determining a visual similarity value based on a convolutional similarity between first and second images, and FIG. 3C illustrates a method 3300 for determining a visual similarity value based on a distance metric (e.g., an optical character recognition (OCR) distance) between the first and second images.

Figure 7:
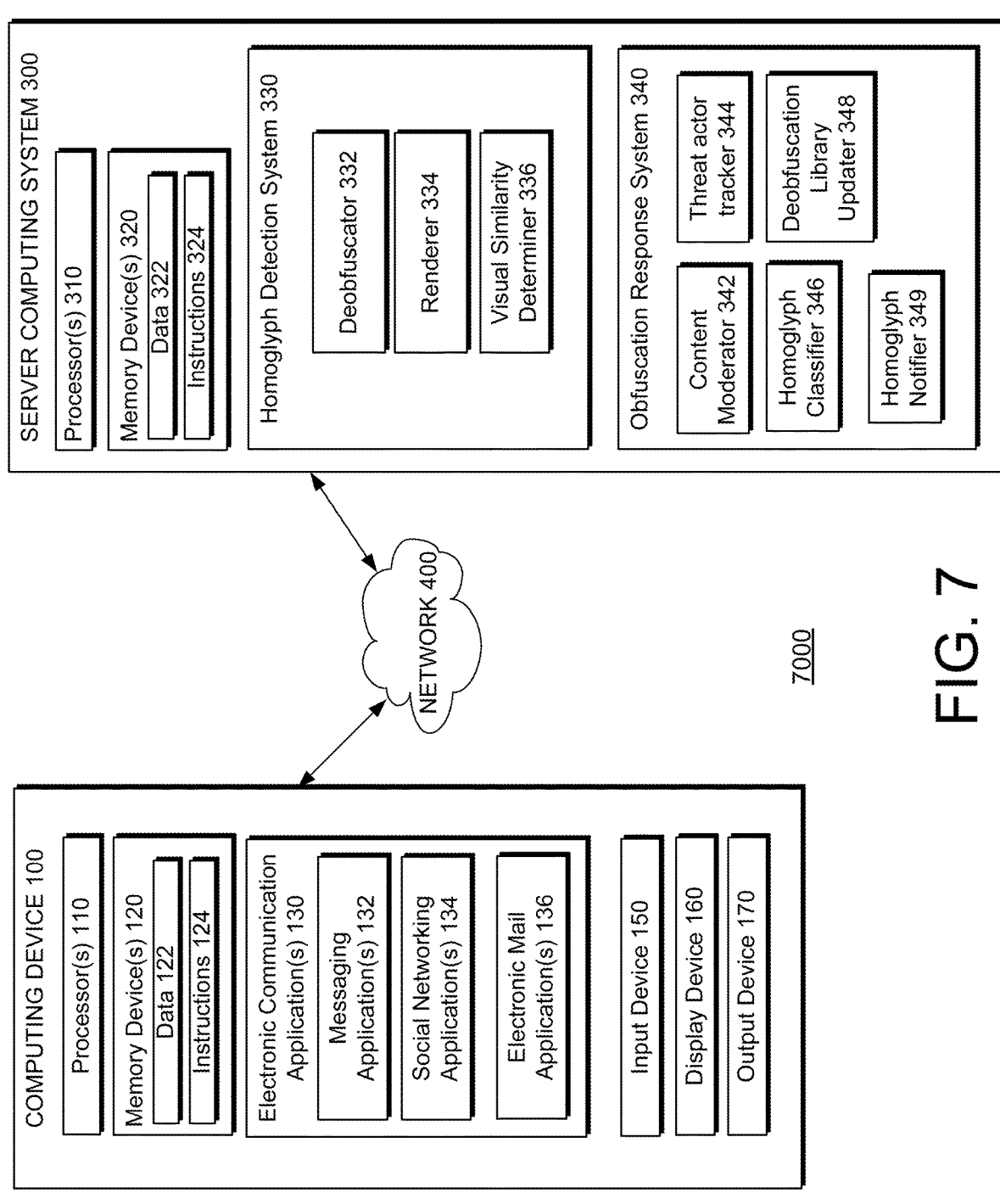
FIG. 7 illustrates an example system, according to one or more example embodiments of the disclosure.

Referring to FIG. 3A, at operation 3110 the homoglyph detection system 330 (e.g., renderer 334 of the homoglyph detection system 330 as shown in FIG. 7) receives the first string of characters and the second string of characters.

At operation 3120, the renderer 334 is configured to render the first string of characters (e.g., by using a text rendering library) to obtain a first image and to render the second string of characters (e.g., by using the text rendering library) to obtain a second image. For example, each of the first string of characters and second string of characters can be rendered by the renderer 334 using a same font (e.g., Roboto, Arial, etc.).

At operation 3130 the homoglyph detection system 330 (e.g., visual similarity determiner 336 of the homoglyph detection system 330 as shown in FIG. 7) may be configured to determine a number of different pixels between the first and second images. For example, the visual similarity determiner 336 may determine pixel-wise differences using image comparison tools, an image-diffing library, and the like. For example, where a number of pixels which are different between the first and second images is low, the structural similarity is determined to be more similar compared to where the number of pixels which are different between the first and second images is high. If kerning or other width changes are present in the first and second images, the renderer 334 and visual similarity determiner 336 may be configured to utilize a fixed-width font with respect to the first and second string of characters.

At operation 3140 the homoglyph detection system 330 (e.g., visual similarity determiner 336 of the homoglyph detection system 330 as shown in FIG. 7) may be configured to determine a structural similarity index measure (SSIM) between the first and second images to determine a visual similarity value. The SSIM provides a measure of perceived difference between the first and second images. SSIM is advantageous in that an SSIM can be obtained for non-textual characters (such as an emoji) and the process for determining the SSIM is much faster and simpler than other methods including an optical character recognition based approach. For example, the SSIM value may be calculated according to known methods including the equation SSIM $(x, y)=[l(x,y)]^{\alpha} \cdot [c(x,y)]^{\beta} \cdot [s(x, y)]^{\gamma}$ where $l(x,y)$ is the luminance term measuring an overall brightness of the two images x and y, $c(x,y)$ is a contrast term measuring the contrast or degree of intensity differences between the two images, $s(x,y)$ is a structure term measuring the structural similarity between the two images, and $\alpha$, $\beta$, $\gamma$, are weights (e.g., $\alpha$, $\beta$, $\gamma$ may be set to 1).

In some implementations, the SSIM value may be used by the visual similarity determiner 336 as the visual similarity value. In some implementations, a combination (e.g., a weighted combination) of the SSIM value and a value associated with the number of characters which have been replaced (swapped out) may be used as the visual similarity value. In some implementations, a combination (e.g., a weighted combination) of the SSIM value and a value associated with the number of pixels which are different between the first and second images may be used as the visual similarity value. In some implementations, a combination (e.g., a weighted combination) of the SSIM value, a value associated with the number of pixels which are different between the first and second images, and a value associated with the number of characters which have been replaced (swapped out) may be used as the visual similarity value. The visual similarity value may also be converted into a human readable form which is easier to understand. For example, as illustrated in FIG. 5, at line 4 a mean structural similarity value of 0.995509583 has been converted to a human readable value of 0.45 while at line 5 a mean structural similarity value of 0.999736530 has been converted to a human readable value of 0.03. Here, the lower human readable value of 0.03 indicates that the obfuscated text from line 5 is more likely to include a homoglyph than the obfuscated text from line 4 having the higher human readable value of 0.45, for example, due to the differences in the number of pixels being higher than compared to the differences in the number of pixels associated with line 4.

In some implementations, in addition to the SSIM, or alternatively, the visual similarity determiner 336 may utilize another metric which quantitatively describes the structural similarity differences between the first and second images (e.g., average error, mean absolute error, mean squared error, peak signal-to-noise ratios, feature-based metrics, and the like) as the visual similarity value.

As will be explained with reference to FIG. 4, the visual similarity value may be compared against a threshold value (or against first and second threshold values) in determining whether a homoglyph is present (e.g., a malicious homoglyph) in the first string of characters, and appropriate actions may be taken.

Referring now to FIG. 3B, the method 3200 for determining the visual similarity value based on the convolutional similarity between first and second images will be explained.

In FIG. 3B, operations 3210 and 3220 are similar to those of operations 3110 and 3120 explained above with respect to FIG. 3A. Therefore, a detailed explanation of those operations will be omitted for the sake of brevity.

At operation 3230 the homoglyph detection system 330 (e.g., visual similarity determiner 336 of the homoglyph detection system 330 as shown in FIG. 7) may be configured to apply a convolutional filter to assess a similarity between the first and second images, with more similar images considered more indicative of homoglyphic attacks. For example, the visual similarity determiner 336 may be configured to extract first and second features from each of the first image and the second image, and obtain a feature map or feature vectors for each of the first image and the second image based on the extracted first and second features.

At operation 3240 the homoglyph detection system 330 (e.g., visual similarity determiner 336 of the homoglyph detection system 330 as shown in FIG. 7) may be configured to determine a distance metric between the obtained first and second features. For example, the visual similarity determiner 336 may determine a similarity value indicating a degree of similarity between the feature maps or feature vectors using a distance metric (e.g., by using a cosine similarity or Euclidean distance).

As an example, a cosine similarity value between two images may be calculated according to known methods. For example, the first and second images may be converted to grayscale, a Sobel filter can be used to extract edge features from each of the first and second images, and two sets of feature vectors can be obtained. The feature vectors may be flattened and the cosine similarity may be calculated based on a dot product of the two flattened feature vectors (A, B) divided by the product of norms of A and B (e.g., dot_product(A,B)/(norm (A)*norm(B)). The cosine similarity value between the first and second images may be normalized to obtain a value between 0 and 1 with 1 indicating the images are identical and 0 indicating the images are completely dissimilar.

In some implementations, the similarity value obtained by applying a convolutional filter to the first and second images may be used by the visual similarity determiner 336 as the visual similarity value. In some implementations, a combination (e.g., a weighted combination) of the similarity value and a value associated with the number of characters which have been replaced (swapped out) may be used as the visual similarity value. In some implementations, a combination (e.g., a weighted combination) of the similarity value and a value associated with the number of pixels which are different between the first and second images may be used as the visual similarity value. In some implementations, a combination (e.g., a weighted combination) of the similarity value, a value associated with the number of pixels which are different between the first and second images, and a value associated with the number of characters which have been replaced (swapped out) may be used as the visual similarity value. The visual similarity value may also be converted into a human readable form which is easier to understand.

As will be explained with reference to FIG. 4, the visual similarity value may be compared against a threshold value (or against first and second threshold values) in determining whether a homoglyph is present (e.g., a malicious homoglyph) in the first string of characters, and appropriate actions may be taken.

Referring now to FIG. 3C, the method 3300 for determining the visual similarity value based on a distance metric (e.g., a Hamming distance or optical character recognition (OCR) distance) between the first and second images, will be explained.

In FIG. 3C, operations 3310 and 3320 are similar to those of operations 3110 and 3120 explained above with respect to FIG. 3A. Therefore, a detailed explanation of those operations will be omitted for the sake of brevity.

At operation 3330 the homoglyph detection system 330 (e.g., visual similarity determiner 336 of the homoglyph detection system 330 as shown in FIG. 7) may be configured to apply an OCR tool (e.g., from OCR tools 380 shown in FIG. 6) on the first and second images to obtain a first OCR string of characters and a second OCR string of characters.

At operation 3140 the homoglyph detection system 330 (e.g., visual similarity determiner 336 of the homoglyph detection system 330 as shown in FIG. 7) may be configured to determine a distance metric between the first OCR string of characters and the second OCR string of characters to obtain the visual similarity value. For example, the visual similarity determiner 336 may calculate a Hamming distance of the two resulting OCR'd strings, with a lower Hamming distance indicating a likely homoglyph attack. For example, corresponding pixels in the two images can be compared where, for each pixel position, if the values in the two images are the same, the Hamming distance is incremented by 0 and if the values are different, the Hamming distance is incremented by 1. For example, the total Hamming distance can be divided by the total number of pixels in the first and second images to determine the similarity between the images. If there are no differences (i.e., the first and second images are identical) the Hamming distance is zero. In some implementations, a scale between 0 and 1 can be utilized by normalizing the Hamming distance, where 1 indicates the images are identical and 0 indicates the images are completely dissimilar.

In some implementations, the similarity value obtained by determining the OCR distance may be used by the visual similarity determiner 336 as the visual similarity value. In some implementations, a combination (e.g., a weighted combination) of the similarity value and a value associated with the number of characters which have been replaced (swapped out) may be used as the visual similarity value. In some implementations, a combination (e.g., a weighted combination) of the similarity value and a value associated with the number of pixels which are different between the first and second images may be used as the visual similarity value. In some implementations, a combination (e.g., a weighted combination) of the similarity value, a value associated with the number of pixels which are different between the first and second images, and a value associated with the number of characters which have been replaced (swapped out) may be used as the visual similarity value. The visual similarity value may also be converted into a human readable form which is easier to understand.

As will be explained with reference to FIG. 4, the visual similarity value may be compared against a threshold value (or against first and second threshold values) in determining whether a homoglyph is present (e.g., a malicious homoglyph) in the first string of characters, and appropriate actions may be taken.

Figure 4:
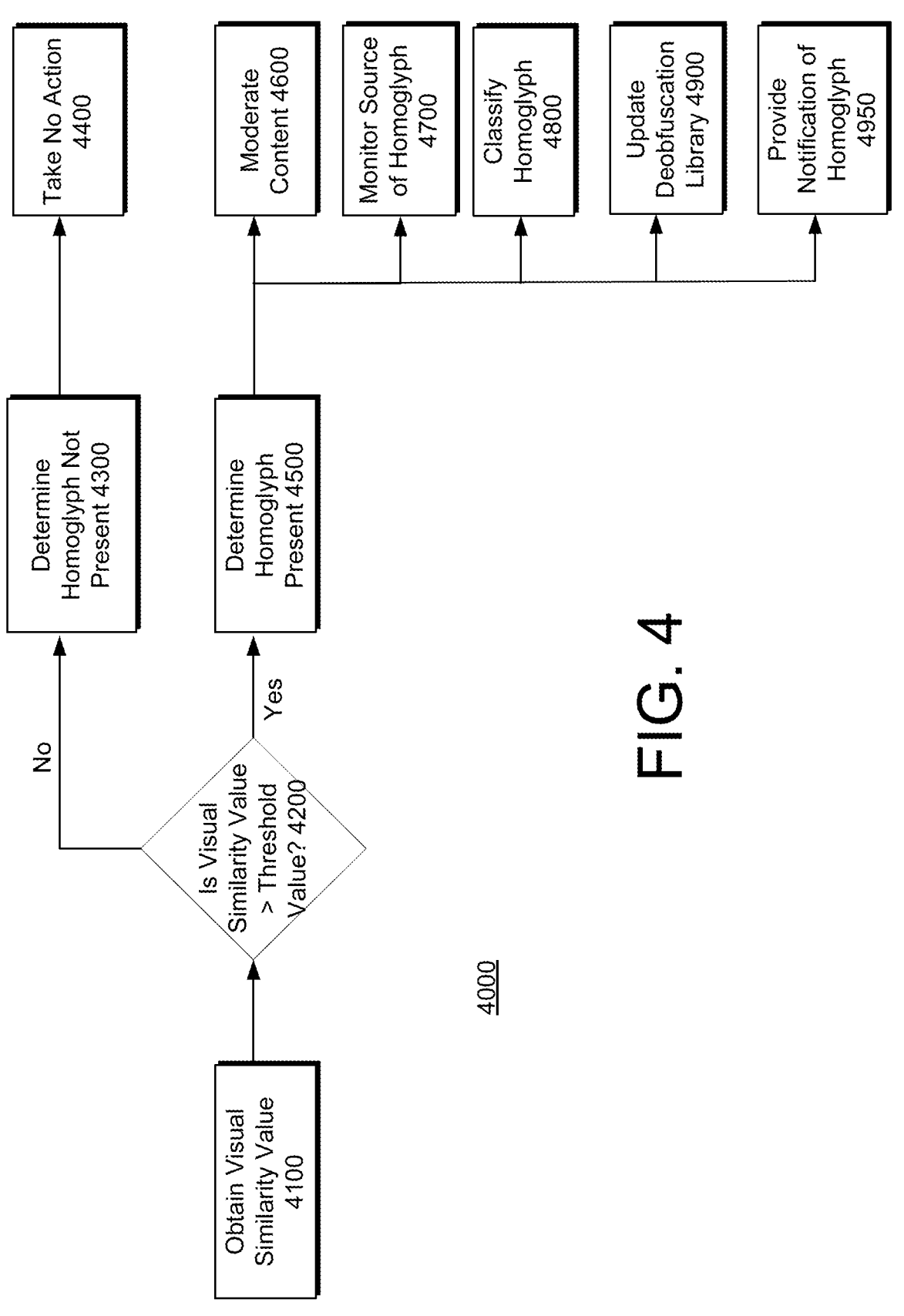
FIG. 4 illustrates an example flow diagram for various responses taken based on a received visual similarity value, according to one or more example embodiments of the disclosure.

Referring now to FIG. 4, an example flow diagram for various responses taken based on a received visual similarity value is illustrated, according to one or more example embodiments of the disclosure.

In FIG. 4, the method 4000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, operations of the method 4000 is performed by the homoglyph detection system 330 and/or obfuscation response system 340 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel.

In FIG. 4, the method 4000 includes operation 4100 in which a visual similarity value is obtained, operation 4200 in which the visual similarity value is compared against a threshold value, operation 4300 in which it is determined that a homoglyph is not present in the first string of characters when the comparison indicates the visual similarity value is not greater than the threshold value, and operation 4400 in which it is determined that a homoglyph is present in the first string of characters when the comparison indicates the visual similarity value is greater than the threshold value. The visual similarity value may be determined by the homoglyph detection system 330 (e.g., the visual similarity determiner 336) as discussed with reference to FIGS. 3A-3C. In some implementations, the visual similarity determiner 336 itself may determine whether a homoglyph is present in the first string of characters and thus may perform operations 4100, 4200, 4300, and 4500 as indicated in FIG. 4. In other implementations, the visual similarity determiner 336 may provide the visual similarity value to the obfuscation response system 340 and the obfuscation response system 340 may determine whether a homoglyph is present in the first string of characters and thus may perform operations 4100, 4200, 4300, 4500 as indicated in FIG. 4.

In addition to the above operations, the obfuscation response system 340 may perform one or more of operations 4600, 4700, 4800, 4900 as indicated in FIG. 4, as appropriate. For example, at operation 4600 the obfuscation response system 340 (e.g., content moderator 342 shown in FIG. 7) may be configured to moderate content relating to an electronic communication which includes the first string of characters. Here, moderating content may include one or more of removing content associated with the first string of characters, modifying content associated with the first string of characters, or preventing content associated with the first string of characters from being transmitted. For example, if the first string of characters is part of an input text to a messaging platform, the content moderator 342 can prevent the first string of characters (or content associated with the first string of characters) from being presented on the messaging platform or remove or modify the first string of characters (or content associated with the first string of characters) from the messaging platform if the first string of characters has already been posted or displayed on the messaging platform.

For example, at operation 4700 the obfuscation response system 340 (e.g., threat actor tracker 344 as shown in FIG. 7) may be configured to monitor the source of a homoglyph which transmits or provides content that includes the first string of characters. For example, the threat actor tracker 344 may flag an account or user associated with transmitting or providing content that includes the first string of characters which includes a homoglyph. The threat actor tracker 344 may monitor the account or user to determine whether the account or user is engaging in abusive or fraudulent behavior (e.g., by repeatedly transmitting or providing content which includes homoglyphs, by directing consumers of the content to fraudulent websites, etc.).

For example, at operation 4800 the obfuscation response system 340 (e.g., homoglyph classifier 346 as shown in FIG. 7) may be configured to categorize or classify the homoglyph included in the first string of characters. For example, the homoglyph classifier 346 may categorize the homoglyph as an attack on a computing system (e.g., as part of a phishing scam), as spam, as an abuse message, etc.

For example, at operation 4900 the obfuscation response system 340 (e.g., deobfuscation library updater 348 as shown in FIG. 7) may be configured to update or improve a deobfuscation library by identifying new visually similar characters to add to mappings stored by the deobfuscation library (e.g., deobfuscation mapping data store 360). For example, when the server computing system 300 determines a homoglyph is present in the first string of characters, the combination of the first string of characters may be added to the deobfuscation library (e.g., for future deobfuscating purposes).

For example, at operation 4950 the obfuscation response system 340 (e.g., homoglyph notifier 349 as shown in FIG. 7) may be configured to provide a notification regarding the presence of the homoglyph. For example, the notification may be provided to an administrator of the server computing system 300, to an intended recipient of the electronic communication, or to any other entity or user which may request or benefit from receiving information about the homoglyph. For example, the notification may be presented in the form of a warning output at a computing device (e.g., on a display, an audible warning, haptic feedback warning, etc.). The notification may be transmitted to another computing system via network 400 or used by the server computing system 300 itself for improving the security of the network 400, for making automated filtering or moderation decisions, and the like. The notification may include the associated visual similarity value which may also be used for improving the security of the network 400, for making automated filtering or moderation decisions, and the like. In some implementations, the notification and/or the associated visual similarity value may be used as an input together with other contextual data as part of a machine learning algorithm for making automated filtering or moderation decisions, and the like.

FIG. 5 is an example table illustrating results for deobfuscating various input strings of characters and determining visual similarity values, according to one or more example embodiments of the disclosure. Referring to FIG. 5, seven examples are provided in the table 5000 which has seven numbered lines corresponding to the respective examples.

In a first example, at line 1, the obfuscated text "yeti-◌" (the first string of characters) is received by the homoglyph detection system 330. The homoglyph detection system 330 (e.g., deobfuscator 332) performs a deobfuscation process with respect to the first string of characters to generate the deobfuscated text "yeti-◌" (the second string of characters), for example by referencing the deobfuscation mapping data store 360. In some implementations, when an emoji or other graphical image or icon is included in the obfuscated text, the deobfuscator 332 may be configured to ignore the emoji or other graphical image or icon. That is, the emoji or other graphical image or icon is not subjected to the deobfuscation process by the deobfuscator 332 and is maintained. In this first example, none of the second string of characters "yeti-◌" was replaced by obfuscation. Therefore, the homoglyph detection system 330 may be configured to end the process and determine that no homoglyph is present in the first string of characters. The mean structural similarity value of 1 also indicates the rendered first and second images are identical. However, the homoglyph detection system 330 may be configured to not perform rendering of the first and second string of characters when it is determined none of the second string of characters is replaced by obfuscation.

In a second example, at line 2, the obfuscated text " ꓥdd ᵔꓲꓳ" (the first string of characters) is received by the homoglyph detection system 330. The homoglyph detection system 330 (e.g., deobfuscator 332) performs a deobfuscation process with respect to the first string of characters to generate the deobfuscated text "yddilc" (the second string of characters), for example by referencing the deobfuscation mapping data store 360. In this second example, four of the second string of characters were replaced by obfuscation. Therefore, the homoglyph detection system 330 may be configured to further determine a visual similarity value based on the first and second string of characters. The homoglyph detection system 330 may be configured to perform one or more of the processes described with respect to FIGS. 3A-3C to determine one or more visual similarity values. In this second example, the method of FIG. 3A was performed. As shown in FIG. 5, 1690 pixels were identified as different between the first and second rendered images. The SSIM value was further calculated to be 0.991262885 and the human-readable SSIM score was further calculated to be 0.87.

The visual similarity determiner 336 and/or obfuscation response system 340 may compare the SSIM value or the human-readable SSIM score with a threshold value to determine whether a homoglyph (e.g., a malicious homoglyph) is present in the first string of characters. For example, the homoglyph detection system 330 and/or obfuscation response system 340 may set the threshold value to 0.99 in the context of the SSIM score such that when the calculated SSIM score is greater than 0.99 the homoglyph detection system 330 and/or obfuscation response system 340 may determine a homoglyph (e.g., a malicious homoglyph) is present in the first string of characters. For example, the homoglyph detection system 330 and/or obfuscation response system 340 may set the threshold value to 0.90 in the context of the human-readable SSIM score such that when the calculated human-readable SSIM score is less than 0.90 the homoglyph detection system 330 and/or obfuscation response system 340 may determine a homoglyph (e.g., a malicious homoglyph) is present in the first string of characters. The above-mentioned threshold values are merely examples, and other values may be used (e.g., 0.98 for the SSIM threshold value or 1.0 for the human-readable SSIM threshold value).

In another example, the visual similarity determiner 336 and/or obfuscation response system 340 may compare the SSIM value or the human-readable SSIM score with first and second threshold values to determine whether a homoglyph (e.g., a malicious homoglyph) is present in the first string of characters. For example, the homoglyph detection system 330 and/or obfuscation response system 340 may set the first threshold value to 0.99 and the second threshold value to be a value greater than 1, in the context of the SSIM score such that when the calculated SSIM score is greater than 0.99 and less than or equal to 1 (assuming at least one character has been replaced by obfuscation when the SSIM score is one), the homoglyph detection system 330 and/or obfuscation response system 340 may determine a homoglyph (e.g., a malicious homoglyph) is present in the first string of characters. For example, the homoglyph detection system 330 and/or obfuscation response system 340) may set the first threshold value to 0.90 and the second threshold value to be any value less than 0), in the context of the human-readable SSIM score such that when the calculated human-readable SSIM score is less than 0.90 and greater than or equal to zero (assuming at least one character has been replaced by obfuscation when the human-readable SSIM score is zero) the homoglyph detection system 330 and/or obfuscation response system 340 may determine a homoglyph (e.g., a malicious homoglyph) is present in the first string of characters. The above-mentioned threshold values are merely examples, and other values may be used (e.g., 0.98 for the SSIM first threshold value or 1.0 for the human-readable SSIM first threshold value).

Referring back to FIG. 5, the third example, at line 3, is similar to the first example in that none of the second string of characters was replaced by obfuscation. Therefore, the homoglyph detection system 330 may be configured to end the process and determine that no homoglyph is present in the first string of characters.

The fourth example, at line 4, is similar to the second example except that fewer characters (one) were replaced and there were fewer pixel differences between the first and second images. The SSIM score (mean structural similarity) is higher with respect to the fourth example compared to the second example. Accordingly, the homoglyph detection system 330 and/or obfuscation response system 340 may determine the fourth example is more likely to include a homoglyph (or a malicious homoglyph) than the second example.

The fifth example, at line 5, is similar to the fourth example in that one character was replaced, however the fifth example has fewer pixel differences between the first and second images. The SSIM score (mean structural similarity) is higher with respect to the fifth example compared to the fourth example. Accordingly, the homoglyph detection system 330 and/or obfuscation response system 340 may determine the fifth example is more likely to include a homoglyph (or a malicious homoglyph) than the fourth example.

The sixth example, at line 6, is similar to the second example except that fewer characters (three) were replaced and there were fewer pixel differences between the first and second images. The SSIM score (mean structural similarity) is higher with respect to the sixth example compared to the second example. Accordingly, the homoglyph detection system 330 and/or obfuscation response system 340 may determine the sixth example is more likely to include a homoglyph (or a malicious homoglyph) than the second example.

The seventh example, at line 7, illustrates an example in which all characters have been replaced (24) and pixel differences between the first and second images are much higher compared to the other examples. The SSIM score (mean structural similarity) is much lower compared to the other examples. Accordingly, the homoglyph detection system 330 and/or obfuscation response system 340 may determine the seventh example is less likely to include a homoglyph (or a malicious homoglyph) than the other examples. For example, the homoglyph detection system 330 and/or obfuscation response system 340 may determine the seventh example does not include a homoglyph (or a malicious homoglyph) based on a threshold value of 0.99 for the SSIM score or a threshold value of 0.90 for the human-readable SSIM score.

Figure 6:
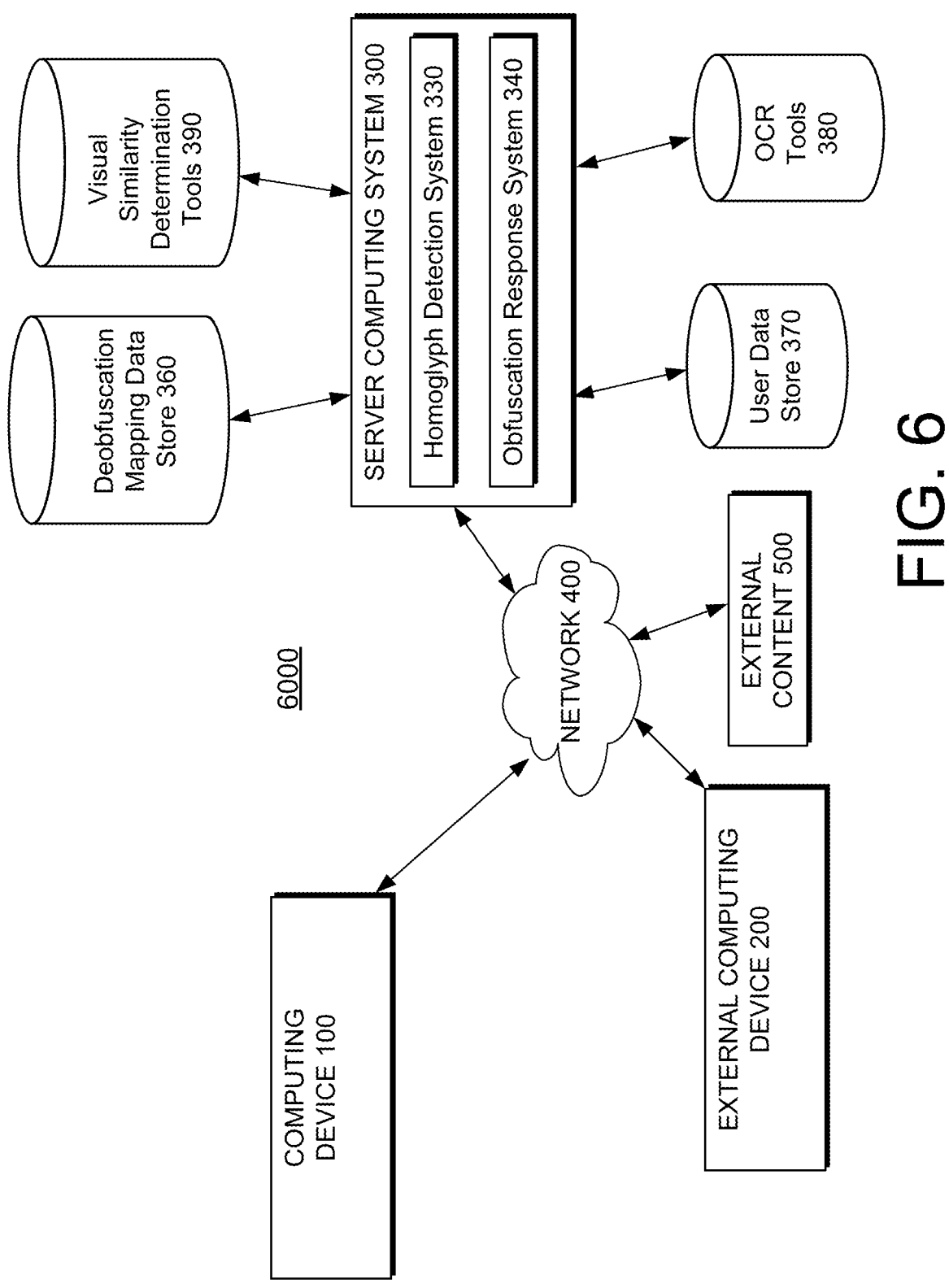
FIG. 6 illustrates an example system, according to one or more example embodiments of the disclosure.

FIGS. 6 and 7 are example systems according to examples of the disclosure which provide an overview of example systems that may be employed to implement the methods described herein for detecting the presence of a homoglyph in an input text string and taking appropriate actions in response to detecting the homoglyph.

FIG. 6 is an example system according to one or more example embodiments of the disclosure. FIG. 6 illustrates an example of a system 6000 which includes a computing device 100, an external computing device 200, a server computing system 300, and external content 500, which may be in communication with one another over a network 400. For example, the computing device 100 and the external computing device 200 can include any of a personal computer, a smartphone, a tablet computer, a global positioning service device, a smartwatch, and the like. The network 400 may include any type of communications network including a wired or wireless network, or a combination thereof. The network 400 may include a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

As explained herein, in some implementations the computing device 100 and/or server computing system 300 may form part of a deobfuscation system which can detect or determine the presence of a homoglyph in an input text (string of characters) and take appropriate action in response to detecting or determining the presence of the homoglyph in an input text (string of characters).

In some example embodiments, the server computing system 300 may obtain data from one or more of a deobfuscation mapping data store 360 or user data store 370), or access one or more of OCR tools 380 or visual similarity determination tools 390, to implement various operations and aspects of the deobfuscation system as disclosed herein. The deobfuscation mapping data store 360 and user data store 370 may be integrally provided with the server computing system 300 (e.g., as part of the one or more memory devices 320 of the server computing system 300) or may be separately (e.g., remotely) provided. Further, deobfuscation mapping data store 360 and user data store 370 can be combined as a single data store (database) or may be a plurality of respective data stores. Data stored in one data store may overlap with some data stored in another data store. In some implementations, one data store may reference data that is stored in another data store.

The deobfuscation mapping data store 360 is provided to illustrate potential data that could be analyzed, in some embodiments, by the server computing system 300 to identify characters which have been obfuscated in a string of characters. For example, the deobfuscation mapping data store 360 can store a list of confusable characters (characters that may be confused with others). For example, the deobfuscation mapping data store 360) can store a character deobfuscation library to map Unicode strings that may have been obfuscated to a target character set. For example, the deobfuscation mapping data store 360 may be referenced by the deobfuscator 332 to deobfuscate a string of characters which are received by the server computing system 300.

The user data store 370 is provided to illustrate potential data that could be analyzed, in some embodiments, by the server computing system 300 to identify user preferences, for example user preferences in the context of detecting homoglyphs. For example, threshold values may be set by a user and stored as part of the preferences of a user. For example, the user data store may include user preferences with respect to actions to be taken in response to a homoglyph being detected. User data may not be collected, used, or analyzed unless the user has consented after being informed of what data is collected and how such data is used. Further, in some embodiments, the user can be provided with a tool (e.g., via a user account) to revoke or modify the scope of permissions. In addition, certain information or data can be treated in one or more ways before it is stored or used, so that personally identifiable information is removed or stored in an encrypted fashion. Thus, particular user information stored in the user data store 370 may or may not be accessible to the server computing system 300 based on permissions given by the user, or such data may not be stored in the user data store 370 at all.

OCR tools 380 may store or reference tools which are capable of recognizing text from a document (e.g., scanned document), images, photographs, PDFs, etc. For example, an OCR tool may include Tesseract or other available OCR software applications. The output of the OCR tools 380 may be in text form. As described herein, the OCR tools 380 may be implemented to obtain the first and second OCR string of characters in method 3300 of FIG. 3C to determine a visual similarity value.

Visual similarity determination tools 390 may store or reference tools which are implemented by the server computing system 300 to determine a visual similarity value between two images. For example, visual similarity determination tools 390 may store or reference one or more text rendering libraries to render the first and second string of characters. For example, visual similarity determination tools 390 may store or reference one or more image comparison applications (e.g., ImageMagick, PixelCompare, etc.) to compare the first and second images which are obtained by rendering the first and second strings of characters. As described herein, the visual similarity determination tools 390 may be implemented to render the first and second string of characters and to determine a visual similarity value in methods 3100, 3200, 3300 of FIGS. 3A-3C.

External content 500 can be any form of external content including news articles, webpages, video files, audio files, written descriptions, ratings, game content, social media content, photographs, commercial offers, transportation method, weather conditions, sensor data obtained by various sensors, or other suitable external content. The computing device 100, external computing device 200, and server computing system 300 can access external content 500 over network 400. External content 500 can be searched by computing device 100, external computing device 200, and server computing system 300 according to known searching methods and search results can be ranked according to relevance, popularity, or other suitable attributes. For example, the server computing system 300 (e.g., deobfuscator 332) may reference external content 500 to determine mappings of characters (e.g., confusable mappings) to determine which characters have been replaced during deobfuscation.

FIG. 7 illustrates more detailed example block diagrams of the computing device and server computing system, according to one or more example embodiments of the disclosure will now be described. Although computing device 100 is represented in FIG. 7, features of the computing device 100 described herein are also applicable to the external computing device 200. In some implementations, the external computing device 200 may receive content (e.g., electronic communications) from the computing device 100 via network 400.

The computing device 100 may include one or more processors 110, one or more memory devices 120, one or more electronic communication applications 130, an input device 150, a display device 160, and an output device 170. The server computing system 300 may include one or more processors 310, one or more memory devices 320, a homoglyph detection system 330, and an obfuscation response system 340.

For example, the one or more processors 110, 310 can be any suitable processing device that can be included in a computing device 100 or server computing system 300. For example, the one or more processors 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The one or more memory devices 120, 320 can include one or more non-transitory computer-readable storage mediums, including a Read Only Memory (ROM), Programmable Read Only Memory (PROM), Erasable Programmable Read Only Memory (EPROM), and flash memory, a USB drive, a volatile memory device including a Random Access Memory (RAM), a hard disk, floppy disks, a blue-ray disk, or optical media such as CD ROM discs and DVDs, and combinations thereof. However, examples of the one or more memory devices 120, 320 are not limited to the above description, and the one or more memory devices 120, 320 may be realized by other various devices and structures as would be understood by those skilled in the art.

For example, the one or more memory devices 120 can store instructions, that when executed, cause the one or more processors 110 to execute one or more electronic communication applications 130 (e.g., one or more messaging applications 132, one or more social networking applications 134, one or more electronic mail applications 136, and the like). For example, the one or more electronic communication applications 130 may receive an input (e.g., a text input) which includes a string of characters. The input may be received by the input device 150 for example. The input string of characters may be transmitted to the server computing system 300, as described according to examples of the disclosure.

One or more memory devices 120 can also include data 122 and instructions 124 that can be retrieved, manipulated, created, or stored by the one or more processors 110. In some example embodiments, such data can be accessed and used as input to implement one or more electronic communication applications 130 (e.g., one or more messaging applications 132, one or more social networking applications 134, one or more electronic mail applications 136, and the like), and to transmit content (e.g., an electronic communication including a string of characters) to another computing device and/or to the server computing system 300.

The computing device 100 may include an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or speech recognition sensor (e.g., a microphone to receive a voice input such as a voice command or a voice query), a track ball, a remote controller, a portable (e.g., a cellular or smart) phone, a tablet PC, a pedal or footswitch, a virtual-reality device, and so on. The input device 150 may also be embodied by a touch-sensitive display having a touchscreen capability, for example. For example, the input device 150 may be configured to receive an input from a user associated with the input device 150. For example, the input may include an input to one or more of the one or more electronic communication applications 130. The input may include input text including a string of characters, a voice input which is converted to text including a string of characters, and the like.

The computing device 100 may include a display device 160 which displays information viewable by the user (e.g., a user interface screen). For example, the display device 160 may be a non-touch sensitive display or a touch-sensitive display. The display device 160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays. The display device 160 can be used by the one or more electronic communication applications 130 installed on the computing device 100 to display information or provide a user interface screen to a user which is capable of receiving an input.

The computing device 100 may include an output device 170 to provide an output to the user and may include, for example, one or more of an audio device (e.g., one or more speakers), a haptic device to provide haptic feedback to a user (e.g., a vibration device), a light source (e.g., one or more light sources such as LEDs which provide visual feedback to a user), a thermal feedback system, and the like.

In accordance with example embodiments described herein, the server computing system 300 can include one or more processors 310) and one or more memory devices 320 which were previously discussed above. The server computing system 300 may also include the homoglyph detection system 330 and the obfuscation response system 340 previously discussed herein.

The homoglyph detection system 330 may be configured to determine whether the first string of characters (e.g., included as part of the text input) includes a homoglyph. For example, the homoglyph detection system 330 330 may include a deobfuscator 332, a renderer 334, and a visual similarity determiner 336.

The deobfuscator 332 may be configured to deobfuscate a string of characters to generate another string of characters, for example, by referencing the deobfuscation mapping data store 360 (see FIG. 6) which maps obfuscated characters to deobfuscated characters. For example, the deobfuscator 332 can deobfuscate a first string of characters "πbots" to generate a second string of characters "nbots," for example by referencing the deobfuscation mapping data store 360. The deobfuscator 332 may be configured to reference known mappings of characters (e.g., confusable mappings) which can be stored at deobfuscation mapping data store 360 or at other sources (e.g., external content 500) to determine which characters have been replaced.

The renderer 334 may be configured to render strings of characters to obtain images. For example, the renderer 334 may render the first string of characters to obtain a first image and render the second string of characters to obtain a second image. For example, the renderer 334 may perform rendering operations by using a text rendering library. For example, the renderer 334 may be configured to render each of the first string of characters and second string of characters can be rendered using a same font (e.g., Roboto, Arial, etc.).

The visual similarity determiner 336 may be configured to obtain a visual similarity metric or value by calculating the Structural Similarity Index Measure (SSIM) of the first and second images, by determining a convolutional similarity between first and second images, or by determining an optical character recognition (OCR) distance between the first and second images. In some implementations, the visual similarity determiner 336 can obtain a visual similarity metric or value based on a combination (e.g., a weighted combination) of the visual similarity metrics or values obtained via the above-mentioned methods. The example methods mentioned above have already been described with respect to FIGS. 3A to 3C and therefore a detailed discussion of those methods will not be repeated for the sake of brevity.

The obfuscation response system 340 may be configured to, in response to a homoglyph being detected in the first string of characters, perform one or more operations. The one or more operations may be performed by the content moderator 342, the threat actor tracker 344, the homoglyph classifier 346, the deobfuscation library updater 348, or the homoglyph notifier 349, as already discussed with respect to FIG. 4.

For example, content moderator 342 may be configured to moderate content relating to an electronic communication which includes the first string of characters. Here, moderating content may include one or more of removing content associated with the first string of characters (or removing the first string of characters itself), modifying content associated with the first string of characters (or modifying the first string of characters itself), or preventing content associated with the first string of characters (or preventing the first string of characters) from being transmitted to, or presented by, another computing device.

For example, threat actor tracker 344 may be configured to monitor the source of a homoglyph which transmits or provides content that includes the first string of characters (e.g., by flagging an account or user associated with transmitting or providing content that includes the first string of characters which includes the homoglyph, or monitoring the account or user to determine whether the account or user is engaging in abusive or fraudulent behavior).

For example, homoglyph classifier 346 may be configured to categorize or classify the homoglyph included in the first string of characters. For example, the homoglyph classifier 346 may categorize the homoglyph as an attack on a computing system (e.g., as part of a phishing scam), as spam, as an abuse message, etc.

For example, deobfuscation library updater 348 may be configured to update or improve a deobfuscation library by identifying new visually-similar characters to add to mappings stored by the deobfuscation library (e.g., deobfuscation mapping data store 360).

For example, homoglyph notifier 349 may be configured to provide a notification regarding the presence of the homoglyph. For example, the notification may be provided to an administrator of the server computing system 300, to an intended recipient of the electronic communication, or to any other entity or user which may request or benefit from receiving information about the homoglyph.

As discussed above, the homoglyph detection system 330 and the obfuscation response system 340 are provided in the server computing system 300. However, in some implementations, the homoglyph detection system 330 and the obfuscation response system 340 may be provided in a computing device, for example, external computing device 200. For example, the external computing device 200 may be configured with a homoglyph detection system to detect the presence of a homoglyph in a string of characters included in an electronic communication (e.g., transmitted from computing device 100) and with an obfuscation response system to, in response to the homoglyph being detected in the string of characters, perform one or more operations including those discussed with respect to FIG. 4. Aspects of the homoglyph detection system 330 and the obfuscation response system 340 described in the context of the server computing system 300 are also applicable to the external computing device 200 including a homoglyph detection system and an obfuscation response system.

Referring again to the drawings, FIG. 8 illustrates another example flow diagram of a non-limiting computer-implemented method according to one or more example embodiments of the disclosure. FIG. 8 illustrates a method with some operations which are similar to operations described with respect to FIG. 2.

In FIG. 8, the method 8000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, operations of the method 8000 are performed by the homoglyph detection system 330 and/or obfuscation response system 340 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 8, method 8000 includes an operation 8100 of the server computing system 300 receiving a first string of characters from the computing device 100. Operation 8100 is similar to operation 2100 of FIG. 2 and therefore a discussion of this operation will not be repeated for the sake of brevity.

At operation 8200, in response to the server computing system 300 receiving the first string of characters, the server computing system 300 may be configured to deobfuscate the first string of characters to generate a second string of characters, for example, by referencing the deobfuscation mapping data store 360 (see FIG. 6) which maps obfuscated characters to deobfuscated characters. Operation 8200 is similar to operation 2200 of FIG. 2 and therefore a discussion of this operation will not be repeated for the sake of brevity.

At operation 8300, the server computing system 300 (e.g., the deobfuscator 332) may be configured to determine whether at least one character from the first string of characters has replaced another character in the second string of characters based on the deobfuscating. For example, the homoglyph detection system 330 may be configured to determine the number of characters which have been obfuscated. For example, the homoglyph detection system 330 can determine whether at least one character from among the first string of characters has replaced another character from among the second string of characters based on whether the mapping of obfuscated characters to deobfuscated characters indicates at least one character from among the first string of characters is a substitute for another character from among the second string of characters. In the example of FIG. 2 where the first string of characters "πbots" obfuscates the second string of characters "nbots," the homoglyph detection system 330 would determine one character from the second string of characters was replaced via obfuscation, based on a comparison between the first string of characters and the second string of characters. When the deobfuscator 332 determines no characters from the second string of characters were replaced via obfuscation, method 8000 may terminate and the homoglyph detection system 330 may determine no homoglyph is present in the first string of characters.

At operation 8400, the server computing system 300 may be configured to, when at least one character from the first string of characters has replaced another character in the second string of characters, render the first string of characters to obtain a first image and render the second string of characters to obtain a second image. For example, renderer 334 may be configured to render the first string of characters (e.g., by using a text rendering library) to obtain the first image and to render the second string of characters (e.g., by using the text rendering library) to obtain the second image. For example, each of the first string of characters and second string of characters can be rendered using a same font (e.g., Roboto, Arial, etc.).

At operation 8500, the server computing system 300 may be configured to determine a visual similarity value based on the first image and the second image. Operation 8500 is similar to operation 2300 of FIG. 2 and therefore a detailed discussion of this operation will not be repeated for the sake of brevity. For example, the visual similarity value may be determined by the visual similarity determiner 336 according to one or more of the processes described with respect to FIGS. 3A-3C.

At operation 8600, the server computing system 300 may be configured to, when a predetermined condition is satisfied based on the visual similarity value, provide an indication a homoglyph is present in the first string of characters. For example, the predetermined condition may be satisfied when the visual similarity value is greater than a threshold value, or greater than a first threshold value and less than a second threshold value, as already described above with respect to FIG. 4. The obfuscation response system 340 may be configured to provide the indication that the homoglyph is present in the first string of characters. For example, the indication may be provided via any of the responsive measures described with respect to FIG. 4 via one or more of the content moderator 342, threat actor tracker 344, homoglyph classifier 346, deobfuscation library updater 348, or homoglyph notifier 349. The above responsive measures are merely examples, and other responsive operations may be performed by the obfuscation response system 340 when the predetermined condition is satisfied.

To the extent terms including "module", and "unit," and the like are used herein, these terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape: optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

Reference has been made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A computer-implemented method, comprising:

receiving, by a computing system comprising one or more processors, an electronic communication including a first string of characters;

deobfuscating the first string of characters to generate a second string of characters;

when at least one character from the first string of characters has replaced another character in the second string of characters based on the deobfuscating, determining a visual similarity value based on a weighted sum of a first visual similarity value and a second visual similarity value by:

rendering the first string of characters to obtain a first image, rendering the second string of characters to obtain a second image, determining a number of pixels which are different between the first image and the second image to obtain the first visual similarity value, and measuring a structural similarity between the first image and the second image based on luminance, contrast, and structural characteristics of the first image and the second image, to obtain the second visual similarity value; and based on the visual similarity value indicating a homoglyph is present in the first string of characters, controlling a computing resource to take remedial action with respect to the electronic communication to improve security associated with the computing system.

2. The computer-implemented method of claim 1, wherein controlling the computing resource comprises controlling the computing resource to monitor a source of the homoglyph which transmits or provides content that includes the first string of characters.

3. The computer-implemented method of claim 2, the method further comprising:

applying a convolutional filter to the first image and the second image to obtain a first feature map corresponding to the first image and a second feature map corresponding to the second image; and the visual similarity value is further based on a distance metric between first feature vectors associated with the first feature map and second feature vectors associated with the second feature map.

4. The computer-implemented method of claim 3, wherein the first image and the second image are rendered in a same font, and the method further comprises determining the homoglyph is present in the first string of characters when the visual similarity value is greater than a first threshold value and less than a second threshold value.

5. The computer-implemented method of claim 1, wherein controlling the computing resource comprises controlling the computing resource to update a deobfuscation library by identifying, based on the homoglyph, new visually-similar characters to add to mappings stored by the deobfuscation library.

6. The computer-implemented method of claim 1, wherein controlling the computing resource comprises controlling the computing resource to moderate content relating to the electronic communication which includes the first string of characters.

7. The computer-implemented method of claim 1, wherein the first image and the second image are rendered in a same font.

8. The computer-implemented method of claim 1, further comprising determining the homoglyph is present in the first string of characters when the visual similarity value is greater than a first threshold value and less than a second threshold value.

9. The computer-implemented method of claim 1, wherein the visual similarity value is further based on a number of characters from the first string of characters which have replaced another character in the second string of characters based on the deobfuscating.

10. The computer-implemented method of claim 1, wherein based on the visual similarity value indicating the homoglyph is present in the first string of characters, the method further comprises at least one of:

providing a notification indicating the first string of characters includes the homoglyph, classifying the electronic communication as spam or unsolicited, or removing the first string of characters from the electronic communication.

11. The computer-implemented method of claim 1, wherein the first string of characters is an input to a messaging platform, and based on the visual similarity value indicating the homoglyph is present in the first string of characters, controlling the computing resource comprises preventing the first string of characters from being presented on the messaging platform or removing the first string of characters from the messaging platform.

12. The computer-implemented method of claim 1, wherein deobfuscating the first string of characters to generate the second string of characters comprises applying a mapping to each character from among the first string of characters to generate the second string of characters, and the method further comprises determining whether at least one character from among the first string of characters has replaced another character from among the second string of characters based on whether the mapping indicates at least one character from among the first string of characters is a substitute for another character from among the second string of characters.

13. The computer-implemented method of claim 1, further comprising:

applying an optical character recognition (OCR) process to the first image to obtain a first OCR string of characters and to the second image to obtain a second OCR string of characters; and calculating a Hamming distance between the first OCR string of characters and the second OCR string of characters, and wherein the visual similarity value is further based on the Hamming distance between the first OCR string of characters and the second OCR string of characters.

14. The computer-implemented method of claim 13, wherein the first image and the second image are rendered in a same font, and the method further comprises determining the homoglyph is present in the first string of characters when the visual similarity value is greater than a first threshold value and less than a second threshold value.

15. A computing system, comprising:

one or more processors; and one or more non-transitory computer-readable media that store instructions that, when executed by the one or more processors, cause the computing system to perform operations, the operations comprising:

receiving an electronic communication including a first string of characters, deobfuscating the first string of characters to generate a second string of characters, when at least one character from the first string of characters has replaced another character in the second string of characters based on the deobfuscating, determining a visual similarity value based on a weighted sum of a first visual similarity value and a second visual similarity value by:

rendering the first string of characters to obtain a first image, rendering the second string of characters to obtain a second image, determining a number of pixels which are different between the first image and the second image to obtain the first visual similarity value, and measuring a structural similarity between the first image and the second image based on luminance, contrast, and structural characteristics of the first image and the second image, to obtain the second visual similarity value, and based on the visual similarity value indicating a homoglyph is present in the first string of characters, controlling a computing resource to take remedial action with respect to the electronic communication to improve security associated with the computing system.

16. The computing system of claim 15, wherein the first image and the second image are rendered in a same font.

17. The computing system of claim 15, wherein as the number of pixels different between the first image and the second image decreases, the first visual similarity value increases.

18. The computing system of claim 15, wherein the visual similarity value is further based on a number of characters from the first string of characters which have replaced another character in the second string of characters based on the deobfuscating.

19. The computing system of claim 15, wherein based on the visual similarity value indicating the homoglyph is present in the first string of characters, the operations further comprise at least one of:

providing a notification indicating the first string of characters includes the homoglyph, classifying the electronic communication as spam or unsolicited, or removing the first string of characters from the electronic communication.

20. A computer-implemented method, comprising:

receiving, by a computing system comprising one or more processors, an electronic communication including a first string of characters;

deobfuscating the first string of characters to generate a second string of characters;

determining whether at least one character from the first string of characters has replaced another character in the second string of characters based on the deobfuscating;

when at least one character from the first string of characters has replaced another character in the second string of characters, rendering the first string of characters to obtain a first image and rendering the second string of characters to obtain a second image;

determining a visual similarity value between the first image and the second image based on a weighted sum of a first visual similarity value and a second visual similarity value by:

determining a number of pixels which are different between the first image and the second image to obtain the first visual similarity value, and measuring a structural similarity between the first image and the second image based on luminance, contrast, and structural characteristics of the first image and the second image, to obtain the second visual similarity value; and when a predetermined condition is satisfied based on the visual similarity value to indicate a homoglyph is present in the first string of characters, controlling a computing resource to take remedial action with respect to the electronic communication to improve security associated with the computing system.

* * * * *